Dec. 26, 1950  J. M. MURRAY  2,535,693
COLLAPSIBLE REEL
Filed Sept. 8, 1945  2 Sheets-Sheet 1
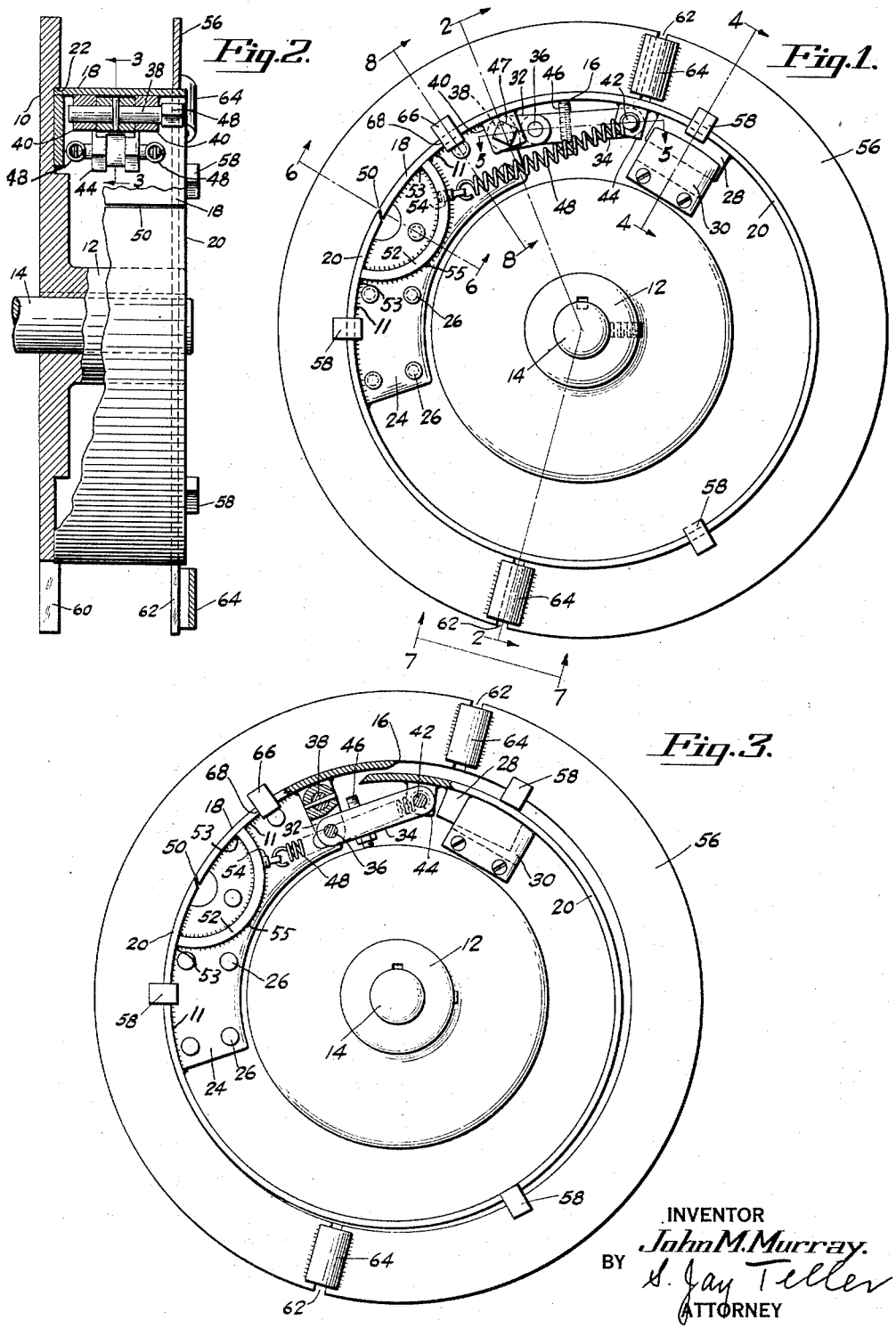
INVENTOR
*John M. Murray.*
BY *S. Jay Teller*
ATTORNEY Dec. 26, 1950　　　　　J. M. MURRAY　　　　　2,535,693
COLLAPSIBLE REEL
Filed Sept. 8, 1945　　　　　　　　　　　2 Sheets-Sheet 2
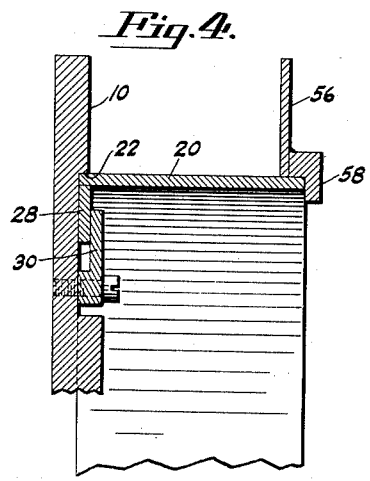
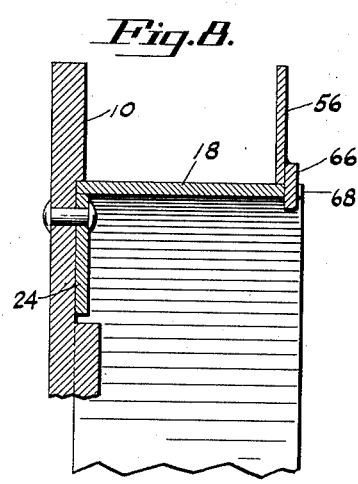
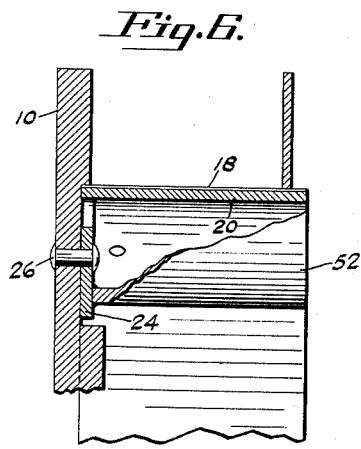
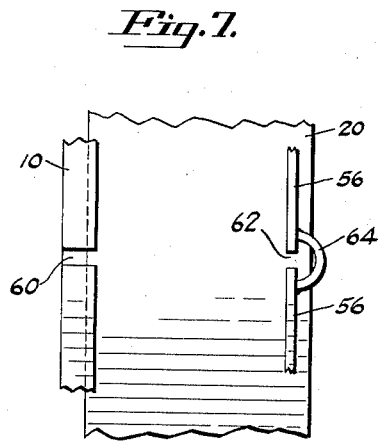
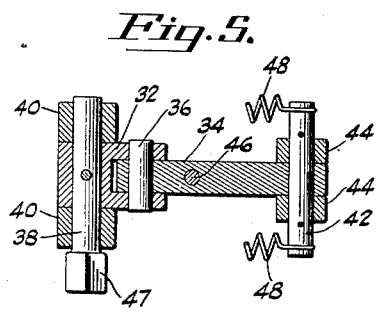
INVENTOR
John M. Murray.
BY S. Jay Teller
ATTORNEY Patented Dec. 26, 1950

2,535,693

UNITED STATES PATENT OFFICE 2,535,693

COLLAPSIBLE REEL

John M. Murray, Waterbury, Conn., assignor to The Torrington Manufacturing Company, Torrington, Conn., a corporation of Connecticut Application September 8, 1945, Serial No. 615,147

16 Claims. (Cl. 242—72)

The invention relates to a winding reel adapted for use with or as a part of a machine for longitudinally slitting long strips of metal. A reel embodying the invention is particularly useful for winding slitted strips of very thin metal as they are delivered from the slitting mechanism of the machine.

The principal object of the invention is to provide a reel wherein the cylindrical winding surface is smooth and substantially continuous without any interruptions or flexible joints which would tend to bend or kink very thin strips which may be wound thereon.

A further object of the invention is to provide a reel of the class and for the purpose described which is simple in construction and reliable in operation and which is adapted to be very readily contracted to facilitate the removal of a wound coil therefrom.

A still further object of the invention is to provide a reel of the class and for the purpose described having improved means for facilitating the application of tie wires to the wound coil.

Other objects of the invention will be apparent from the following specification and claims and from the appended drawings.

Of the drawings:

Fig. 1 is an end view of a reel embodying the invention.

Fig. 2 is a combined side and sectional view, the section being taken along the line 2—2 of Fig. 1.

Fig. 3 is a view similar to Fig. 1 but showing the drum of the reel in collapsed position, a portion of this view being in section along the line 3—3 of Fig. 2.

Fig. 4 is an enlarged fragmentary sectional view taken along the line 4—4 of Fig. 1.

Fig. 5 is a sectional view taken along the line 5—5 of Fig. 1.

Fig. 6 is an enlarged fragmentary sectional view taken along the line 6—6 of Fig. 1.

Fig. 7 is an enlarged fragmentary side view taken in the direction indicated by the arrows 7—7 in Fig. 1.

Fig. 8 is an enlarged fragmentary sectional view taken along the line 8—8 of Fig. 1, the adjacent spring being omitted as are various parts behind the plane of the section.

Referring to the drawings, the reel comprises a main body member or disc 10 having a central apertured hub 12, by means of which it is supported on a drive shaft 14. The shaft is driven in a suitable manner to rotate the disc 10 preferably in the clockwise direction as viewed in Fig. 1.

Carried by the disc 10 is a normally cylindrical barrel which is preferably relatively narrow. The barrel has a transverse separable joint 16 therein, and it has a portion rigidly attached at one edge to the disc 10 throughout a substantial arc adjacent the joint 16. The remaining portion of the barrel is integral throughout and is integral with one end of the aforesaid attached portion. Preferably, for a purpose to be described, the attached portion of the barrel comprises two separate members 18 and 20, these being contiguous and with their outer faces forming parts of the same cylindrical surface. The disc 10 is preferably provided with an annular groove providing an annular or cylindrical inward facing shoulder 22 and the barrel members 18 and 20 are so connected with the disc that their outer faces are in engagement with the shoulder 22. Preferably, and as shown, the members 18 and 20 are connected, as for instance by welding as indicated at 11, with a segmental plate 24 which in turn is attached to the disc 10 by means of rivets 26, 26.

Only a relatively small portion of the barrel member 20 is rigidly attached to the plate 24 and thus to the disc 10, and the remainder of the said member not so attached, while normally engaging the said shoulder 22 on the disc, is flexibly movable inward from its normal cylindrical position to a retracted position. Inasmuch as this inward movement is effected entirely by the flexing of the member, it will be seen that the said inward movement is progressive, starting with a minimum adjacent the plate 24 and increasing to a maximum at the joint 16. This will be more apparent from Fig. 3, which shows the barrel member 20 in its inwardly flexed or contracted position.

Preferably the joint 16 has beveled faces, as shown, so as to facilitate the separation of the adjacent portions of the barrel and the inward flexing of the member 20.

In order that the barrel member 20 may be guided for inward flexing, but nevertheless held against any relative lateral movement, suitable interengaging guiding means are provided on the said member 20 and on the disc 10. As shown, the member 20 is provided adjacent the inner edge thereof and near the joint 16 with a radially inward projecting guide member 28 shown in Figs. 1 and 4. The disc 10 carries a guide member 30 which engages the outer face of the guide member 28, the member 28 being thus guided between the outer face of the disc 10 and the inner face of the member 30. Thus, the barrel member 20 is free to flex inward or outward but lateral movement thereof is prevented.

By preference the barrel member 20 is given a permanent set or bias which causes it to tend automatically to move to its inwardly flexed or contracted position as shown in Fig. 3. This, however, is not essential and this set or bias may be eliminated, so that the member will tend to occupy its normal expanded position as shown in Fig. 1.

A suitable means is provided for holding the flexible portion of the barrel member 20 in its normal expanded position in engagement with the shoulder 22 on the disc 10, said means being releasable to enable the flexible portion to flex or be flexed inward when required. By preference and as shown, the aforesaid means comprises toggle links 32 and 34. These links are pivotally connected with each other at 36 and they are connected at their outer ends with the members 18 and 20 at opposite sides of the joint 16. The link 32 is carried by a pin 38 pivotally mounted in bosses 40, 40 secured to the inner face of the member 18, and the link 34 engages a pin 42 mounted in bosses 44, 44 secured to the inner face of the barrel member 20. With the links in their extended position shown in Fig. 1, the barrel member 20 is held in its normal expanded cylindrical position. However, when the toggle links are collapsed to the relative positions shown in Fig. 3, the flexible barrel portion 20 moves inward to the contracted position shown in the said figure.

In Fig. 1 the toggle links are in locking position, the axis of the pin 36 being above a line connecting the axes of the pins 38 and 42. Preferably, the link 34 carries a stop pin or screw 46 for limiting the movement of the toggle links in the outward direction. In order that the toggle links may be conveniently collapsed manually, the pin 38 is provided with a head 47 adapted to be engaged by a suitable wrench.

Preferably to assist in the collapsing of the toggle links and in the inward movement of the flexible portion of the barrel member 20 tension springs 48, 48 are provided, each of these springs being secured at one end to an extended portion of the before-mentioned pin 42. It will be seen that when the toggle links are collapsed, the springs tend to move the flexible portion of the member 20 in the inward direction.

It has been stated that the barrel comprises two separate members 18 and 20. These members are contiguous, but are spaced apart slightly to provide a narrow transverse slit 50 into which the starting end of the strip to be wound can be inserted. The two members 18 and 20 are preferably reenforced or supplementally supported adjacent the slit 50 and to this end there is provided a segmental bridge member 52 which is secured at its ends by welding 53 or otherwise to the inner faces of the members 18 and 20 and which is secured at its inner edge by welding 55 or otherwise to the plate 24. It will be seen that this member 52 supports the members 18 and 20 and is so shaped as to be spaced from the barrel at the said slit 50.

When the member 52 is provided, it is preferably utilized for the support of the inner ends of the springs 48, 48. As shown, eye members 54 are threaded into apertures in the bridge member 52 and serve for the attachment of the ends of the springs.

The coil to be wound is supported at one side by the outward extending peripheral portion of the disc 10. For supporting the other side of the coil, there is provided a removable flange 56 adapted to surround and fit the barrel when in its expanded position. In order that the flange may be located in a predetermined relative position as concerns transverse movement, it is provided with a plurality of inward extending stops 58, 58 which engage the outer edge of the barrel members 18 and 20 as shown more clearly in Fig. 4.

To facilitate the application of tie wires to the completed coil prior to its removal from the retracted barrel, the disc 10 is provided with a plurality of radial slots 60 which are circumferentially spaced and which extend inward at least to the said shoulder 22. As shown, there are two such slots opposite each other. The flange 56 also has a plurality of radial slots 62 corresponding in number and in spacing to the slots 60 in the disc 10. The slots 62 extend entirely across the flange 56 and bridge elements 64 are therefore provided which extend across the slots to connect the two portions of the flange.

In use, the flange 56 is positioned on the drum with the slots 62 therein in register with the slots 60 in the disc 10. Upon the completion of the winding of a coil the member 20 is moved to its inwardly flexed or contracted position as shown in Fig. 3 and then tie wires are inserted through the slots 60 and 62 and brought up around the coil and fastened so as to prevent uncoiling. Then the flange 56 can be removed from the barrel and thereafter the coil can be removed.

To facilitate the location of the flange 56 with the slots 62 in register with the slots 60, interengaging means are provided on the barrel and on the flange for locating the flange in the desired position. As shown particularly in Fig. 8, the flange 56 carries a stop 66 which enters and fits a notch 68 in the edge portion of the barrel member 18. With the stop 66 entered in the notch 68, the flange is so located as concerns relative rotative movement that the tie wire slots in the flange are in register with the tie wire slots in the disc 10.

In using the reel, the starting end of the strip to be wound is entered in the slit 50, this serving to fasten the said starting end to the reel. Thereupon the reel is rotated in the clockwise direction and rotation is continued until a coil of the desired size is formed. Upon the completion of the coil, rotation is stopped and the barrel member 20 is moved to its inner contracted position by collapsing the toggle links by means of a wrench applied to the head 47. Then the tie wires are put in place in a manner already described, and thereafter the flange 56 can be removed and the completed coil can be removed.

It will be observed that, with the barrel in expanded position, it has a continuous unbroken cylindrical surface, excepting only for the very narrow slit 50. Thus it is possible for very thin and easily bent strips to be wound thereon without any sharp bending or kinking such as would be caused by a reel having a barrel consisting of two or more segments independently movable to effect contraction.

It will be observed that the barrel member 20 is relatively narrow and is supported entirely on the disc 10. The toggle links and the springs for controlling the expansion and retraction of the barrel member are also entirely supported directly or indirectly on the discs and independent of any other part. The outer edge of the barrel member is exposed and, upon removal of the detachable flange 56, is adapted to permit the free removal longitudinally of the coil wound upon the said barrel member.

What I claim is:

1. The combination in a winding reel, of a rotatable supporting disc, a relatively narrow normally cylindrical barrel having a transverse separable joint therein and having a portion rigidly attached at one edge to the disc throughout a substantial arc adjacent the joint, the remaining portion of the barrel being integral throughout and integral with one end of the attached portion and flexibly movable inward from its normal cylindrical position progressively from the attached portion thereof to the said joint, and means supported entirely on the disc with all parts thereof substantially spaced from the axis of rotation and normally serving to hold the flexible portion of the barrel in its expanded cylindrical position for the winding of a coil thereon, the said means being releasable to enable the flexible portion to flex inward to facilitate removal of the coil.

2. The combination in a winding reel, of a rotatable supporting disc, a relatively narrow normally cylindrical barrel engaging at its inner edge with the disc and free from support at its outer edge which outer edge is exposed for the free longitudinal removal from the barrel of a coil that may be wound thereon, the said barrel being provided with a transverse separable joint therein and the said barrel having a portion rigidly attached at its said inner edge to the disc throughout a substantial arc adjacent the joint and having another portion which is integral throughout and integral with one end of the attached portion and which is flexibly movable inward from its normal cylindrical position progressively from the attached portion thereof to the said joint, and means supported entirely on the disc with all parts thereof substantially spaced from the axis of rotation and normally serving to hold the flexible portion of the barrel in its expanded cylindrical position for the winding of a coil thereon, the said means being releasable to enable the flexible portion to flex inward to facilitate removal of the coil.

3. The combination in a winding reel, of a rotatable supporting disc, a relatively narrow normally cylindrical barrel having a transverse separable joint and having a portion rigidly attached at one edge to the disc throughout a substantial arc adjacent the joint, the remaining portion of the barrel being integral throughout and integral with one end of the attached portion and flexibly movable inward from its normal cylindrical position progressively from the attached portion thereof to the said joint, and toggle links substantially spaced in their entirety from the axis of rotation and respectively connected with the disc and with the flexible portion of the barrel for expanding the latter and holding it in its normal expanded cylindrical position for the winding of a coil thereon, the said toggle links being manually collapsible to enable the flexible portion of the barrel to flex inward to facilitate removal of the coil.

4. The combination in a winding reel, of a rotatable supporting disc, a relatively narrow normally cylindrical barrel having a transverse separable joint and having a portion rigidly attached at one edge to the disc throughout a substantial arc adjacent the joint, the remaining portion of the barrel being integral throughout and integral with one end of the attached portion and flexibly movable inward from its normal cylindrical position progressively from the attached portion thereof to the said joint, and toggle links within the barrel for expanding the flexible portion thereof and holding it in its normal expanded cylindrical position for the winding of a coil thereon, the said toggle links being respectively connected directly with the barrel at opposite sides of the joint and being manually collapsible to enable the flexible portion of the barrel to flex inward to facilitate removal of the coil.

5. The combination in a winding reel, of a rotatable supporting disc, a normally cylindrical barrel having a transverse separable joint and having a portion rigidly attached at one edge to the disc throughout a substantial arc adjacent the joint, the remaining portion of the barrel being integral throughout and integral with one end of the attached portion and flexibly movable inward from its normal cylindrical position progressively from the attached portion thereof to the said joint, toggle links within the barrel for expanding the flexible portion thereof and holding it in its normal expanded cylindrical position for the winding of a coil thereon, the said toggle links being respectively connected directly with the barrel at opposite sides of the joint and being manually collapsible to enable the flexible portion of the barrel to flex inward to facilitate removal of the coil, and a stop on one of the toggle links for engaging the interior of the barrel to limit movement of said links in the expanding direction.

6. The combination in a winding reel, of a rotatable supporting disc, a normally cylindrical barrel having a transverse separable joint and having a portion rigidly attached at one edge to the disc throughout a substantial arc adjacent the joint, the remaining portion of the barrel being integral throughout and integral with one end of the attached portion and flexibly movable inward from its normal cylindrical position progressively from the attached portion thereof to the said joint, toggle links within the barrel for expanding the flexible portion thereof and holding it in its normal expanded cylindrical position for the winding of the coil thereon, the said toggle links being respectively connected directly with the barrel at opposite sides of the joint and being manually collapsible to enable the said flexible portion to flex inward to facilitate removal of the coil, and a spring associated with the toggle links tending to flex the flexible portion of the barrel inward when the toggle links are collapsed.

7. The combination in a winding reel, of a rotatable supporting disc, a normally cylindrical barrel having a transverse separable joint and having a portion rigidly attached at one edge to the disc throughout a substantial arc adjacent the joint, the remaining portion of the barrel being integral throughout and integral with one end of the attached portion and flexibly movable inward from its normal cylindrical position progressively from the attached portion thereof to the said joint, toggle links within the barrel for expanding the flexible portion thereof and holding it in its normal expanded cylindrical position for the winding of a coil thereon, the said toggle links being respectively connected directly with the barrel at opposite sides of the joint and being manually collapsible to enable the said flexible portion to flex inward to facilitate removal of the coil, and a tension coil spring connected at one end to the flexible portion of the barrel adjacent the point of toggle link connection therewith and connected at the other end with the disc in such position that the spring is substantially parallel with the toggle link which is connected with the barrel when the said toggle links are in collapsed positions.

8. In a winding reel, the combination of a rotatable supporting disc, a normally cylindrical barrel having a transverse separable joint and having a portion rigidly attached at one edge to the disc throughout a substantial arc adjacent the joint, the remaining portion of the barrel being integral throughout and integral with one end of the attached portion and flexibly movable inward from its normal cylindrical position progressively from the attached portion thereof to the said joint, means for holding the flexible portion of the barrel in its normal expanded cylindrical position for the winding of a coil thereon, the said means being releasable to enable the said flexible portion to flex inward to facilitate removal of the coil, and guiding elements mounted respectively on the disc and on the flexible portion of the barrel permitting inward movement of the said portion but preventing lateral movement thereof.

9. The combination in a winding reel, of a rotatable supporting disc, a relatively narrow normally cylindrical barrel engaging at its inner edge with the disc and exposed at its outer edge for the free longitudinal removal therefrom of a coil that may be wound thereon, the said barrel being provided with a transverse separable joint therein and the said barrel having a portion rigidly attached at its said inner edge to the disc throughout a substantial arc adjacent the joint and having another portion which is integral throughout and integral with one end of the attached portion and which is flexibly movable inward from its normal cylindrical position progressively from the attached portion thereof to the said joint, means supported entirely on the disc for holding the flexible portion of the barrel in its normal expanded cylindrical position for the winding of a coil thereon, the said means being releasable to enable the flexible portion to flex inward to facilitate removal of the coil, and guiding elements mounted respectively on the disc and on the flexible portion of the barrel permitting inward movement of the said portion but preventing lateral movement thereof.

10. In a winding reel, the combination of a rotatable supporting disc, a normally cylindrical barrel having a transverse separable joint and having a portion rigidly attached at one edge to the disc throughout a substantial arc adjacent the joint, the remaining portion of the barrel being integral throughout and integral with one end of the attached portion and flexibly movable inward from its normal cylindrical position progressively from the attached portion thereof to the said joint, means for holding the flexible portion of the barrel in its normal expanded cylindrical position for the winding of a coil thereon, the said means being releasable to enable the said flexible portion to flex inward to facilitate removal of the coil, a radially inward projecting guide member secured to the flexible portion of the barrel adjacent the inner edge thereof and near the said joint, and means on the disc engaging the said guide member to prevent lateral movement of the said flexible portion of the barrel while permitting inward movement thereof.

11. A winding reel comprising in combination, a rotatable supporting disc, a normally cylindrical barrel having a transverse separable joint and having a portion rigidly attached at one edge to the disc throughout a substantial arc adjacent the joint, the said attached portion of the barrel having a transverse slit therein for receiving the starting end of the strip to be wound and the remaining portion of the barrel being integral throughout and integral with one end of the attached portion and flexibly movable inward from its normal cylindrical position progressively from the attached portion thereof to the said joint, a bridge member rigidly connected with the inner face of the barrel at opposite sides of the starting slit therein and shaped to be spaced from the barrel at the said slit, and means for holding the flexible portion of the barrel in its normal expanded cylindrical position for the winding of a coil thereon, the said means being releasable to enable the said flexible portion to flex inward to facilitate removal of the coil.

12. A winding reel comprising in combination, a rotatable supporting disc, a normally cylindrical barrel having a transverse separable joint and having a portion rigidly attached at one edge to the disc throughout a substantial arc adjacent the joint, the said attached portion of the barrel having a transverse slit therein for receiving the starting end of the strip to be wound and the remaining portion of the barrel being integral throughout and integral with one end of the attached portion and flexibly movable inward from its normal cylindrical position progressively from the attached portion thereof to the said joint, a bridge member rigidly connected with the inner face of the barrel at opposite sides of the starting slit and also rigidly connected with the supporting disc, the said member being shaped to be spaced from the barrel at the said slit, and means for holding the flexible portion of the barrel in its normal expanded cylindrical position for the winding of a coil thereon, the said means being releasable to enable the said flexible portion to flex inward to facilitate removal of the coil.

13. A winding reel comprising in combination, a rotatable supporting disc, a normally cylindrical barrel having a transverse separable joint and having a portion rigidly attached at one edge to the disc throughout a substantial arc adjacent the joint, the said attached portion of the barrel having a transverse slit therein for receiving the starting end of the strip to be wound and the remaining portion of the barrel being integral throughout and integral with one end of the attached portion and flexibly movable inward from its normal cylindrical position progressively from the attached portion thereof to the said joint, a bridge member rigidly connected with the inner face of the barrel at opposite sides of the starting slit and also rigidly connected with the supporting disc, the said member being shaped to be spaced from the barrel at the said slit, toggle links within the barrel for expanding the flexible portion thereof and holding it in its normal expanded cylindrical position for the winding of a coil thereon, the said toggle links being respectively connected with the barrel at opposite sides of the joint and being manually collapsible to enable the said flexible portion to flex inward to facilitate removal of the coil, and a spring tending to flex the flexible portion of the barrel inward when the toggle links are collapsed, one end of the spring being connected with the flexible portion of the barrel and the other end thereof being connected with the said bridge member.

14. The combination in a winding reel, of a rotatable supporting disc, a normally cylindrical barrel having a transverse separable joint and having a portion rigidly attached at one edge to the disc throughout a substantial arc adjacent the joint, the remaining portion of the barrel being integral throughout and integral with one end of the attached portion and flexibly movable inward from its normal cylindrical position progressively from the attached portion thereof to the said joint, means for holding the flexible portion of the barrel in its normal expanded cylindrical position for the winding of a coil thereon, the said means being releasable to enable the said flexible portion to flex inward to facilitate removal of the coil, a removable flange adapted to surround and fit the barrel and to be entirely supported thereby when in its expanded position, and stops on the flange adapted to engage the outer edge of the barrel to locate the flange in a predetermined relative position as concerns transverse movement.

15. The combination in a winding reel, of a rotatable supporting disc having an inward facing annular shoulder and having a plurality of circumferentially spaced radial tie wire slots therein extending inward to the said shoulder, a normally cylindrical barrel having a transverse separable joint and having a portion rigidly attached at one edge to the disc throughout a substantial arc adjacent the joint, the remaining portion of the barrel being integral throughout and integral with one end of the attached portion and flexibly movable inward from its normal cylindrical position progressively from the attached portion thereof to the said joint, means for holding the flexible portion of the barrel in its normal expanded cylindrical position for the winding of a coil thereon, the said means being releasable to enable the said flexible portion to flex inward to facilitate removal of the coil, a removable flange adapted to surround and fit the barrel when in its expanded position in engagement with the shoulder on the disc, the said flange having a plurality of radial tie wire slots therein corresponding in number and in spacing to the tie wire slots in the disc, bridge elements on the flange connected therewith at opposite sides of the respective slots, and stops on the flange adapted to engage the outer edge of the barrel to locate the flange in a predetermined relative position as concerns transverse movement.

16. The combination in a winding reel, of a rotatable supporting disc having an inward facing annular shoulder and having a plurality of circumferentially spaced radial tie wire slots therein extending inward to the said shoulder, a normally cylindrical barrel having a transverse separable joint and having a portion rigidly attached at one edge to the disc throughout a substantial arc adjacent the joint, the remaining portion of the barrel being integral throughout and integral with one end of the attached portion and flexibly movable inward from its normal cylindrical position progressively from the attached portion thereof to the said joint, means for holding the flexible portion of the barrel in its normal expanded cylindrical position for the winding of a coil thereon, the said means being releasable to enable the said flexible portion to flex inward to facilitate removal of the coil, a removable flange adapted to surround and fit the barrel when in its expanded position in engagement with the shoulder on the disc, the said flange having a plurality of radial tie wire slots therein corresponding in number and in spacing to the tie wire slots in the disc, bridge elements on the flange connected therewith at opposite sides of the respective slots, stops on the flange adapted to engage the outer edge of the barrel to locate the flange in a predetermined relative position as concerns transverse movement, and interengaging means on the barrel and on the flange for locating the flange as concerns relative rotative movement so that the tie wire slots therein are in register with the tie wire slots in the disc.

JOHN M. MURRAY.

REFERENCES CITED

The following references are of record in the file of this patent:

UNITED STATES PATENTS

| Number | Name | Date |
|---|---|---|
| 1,040,536 | Hansen | Oct. 8, 1912 |
| 1,167,723 | Scott | Jan. 11, 1916 |
| 1,346,812 | Duston | July 20, 1920 |
| 1,780,510 | Wise | Nov. 4, 1930 |
| 1,905,178 | Kohler | Apr. 25, 1933 |